Patented Sept. 24, 1935

2,015,282

UNITED STATES PATENT OFFICE 2,015,282

METHOD OF PRODUCING ANTIRACHITIC SUBSTANCES

August J. Pacini, Chicago, Ill., assignor to American Research Products Inc., Minneapolis, Minn., a corporation of Delaware No Drawing. Application April 7, 1934, Serial No. 719,532

6 Claims. (Cl. 167—81)

This is a continuation in part of my application Serial No. 299,453, filed August 13, 1928, now Patent No. 1,983,944, and of my application Serial No. 239,258, filed December 10, 1927, and which is now Patent No. 1,771,343.

The present invention relates to the production of anti-rachitic material (vitamin D) and concerns itself more particularly with a new and improved process for the treatment of activatable substances, i. e. substances susceptible to anti-rachitic activation, as for example, ergosterol, cholesterol, or other ergosterol containing material, in order to impart anti-rachitic properties thereto.

This invention is based upon the discovery that activatable substances will take on the property of curing rickets when exposed to the action of radiations from naturally radioactive substances such as thorium, radium and uranium.

When utilizing the radiations from either radium, thorium or uranium, one may simply expose an activatable substance to radiations directly produced from a body of these substances in order to impart the anti-rachitic principle to it. However, in the case of radium, particularly, it may be desirable to utilize the effect of radium emanation in the treatment of the activatable material, in place of directly exposing the activatable material to a quantity of the substance radium. It is known that radium continuously gives off its emanation and that while the emanation can be stored in containers for approximately a week, it loses its effect after that time, and it is accordingly essential to utilize the radium emanation shortly after the time of its generation if it is not to be wasted.

The treatment of activatable substances by means of radium emanation to impart thereto the property of curing rickets thereby provides a beneficial use for emanation which might otherwise be wasted.

As an illustrative example of the carrying out of the process with radium emanation, one may prepare a glass tube, which may be thin walled and of small internal diameter, by cleaning it thoroughly with any desired cleaning mixtures followed successively by baths in alcohol, ether and air. One end of the tube is sealed and it is thoroughly dehydrated by exposure in an oven at approximately 100° centigrade for an extended length of time, say 24 hours or more. The tube is removed from the dehydrating oven and is thoroughly flamed to a heat not quite sufficiently intense to cause any collapses of the tube, and in this heated condition the tube is placed in a desiccator until cooled. A quantity of previously dehydrated, finely pulverized cholesterol is then introduced into the tube and the air is thoroughly evacuated therefrom while the tube containing the cholesterol is maintained at about the temperature of boiling water, i. e., 100° C. to 105° C. This is for the purpose of removing the air from the tube and from the contained cholesterol.

Thereafter the tube is sealed to a radium pump glass system in place of the usual capillary tube, and the emanation is allowed to enter the tube, following which it is either sealed off into lengths according to convenience, or allowed to remain in its original length. The result is a glass tube which has been evacuated and which contains comparatively water-free cholesterol and radium emanation. The millicuries of radium emanation content may be measured by the usual electroscopic means for purposes of observation to insure activity.

The radium emanation contained in the tube is permitted to act on the cholesterol from two to four days, it being noted that after four days the decay in the activity of the radium emanation is considerable, so that any further activation is greatly reduced. At the completion of the exposure, the cholesterol containing tube is broken open and the activated cholesterol possessing anti-rachitic properties is removed in any desired manner as for example by use of the solvent ether, from which the activated material can be readily recrystallized.

Having now described my invention, what I claim is new and desire to secure by Letters Patent of the United States is as follows:

1. The process of treating activatable material to impart thereto the anti-rachitic (vitamin D), property which comprises exposing the same to radiations from naturally radio-active substances.

2. The process of treating ergosterol containing material to impart thereto the anti-rachitic (vitamin D) property, which comprises exposing the same to radiations from naturally radioactive substances.

3. The process of treating activatable material to impart thereto the anti-rachitic (vitamin D) property, which comprises dehydrating the activatable material, and exposing the same to radiations from naturally radioactive substances.

4. The process of treating activatable material to impart thereto the anti-rachitic (vitamin D) property, which comprises exposing the same to radiations from radium.

5. The process of treating activatable material to impart thereto the anti-rachitic (vitamin D) property, which comprises exposing the same to radiations from thorium.

6. The process of treating activatable material to impart thereto the anti-rachitic (vitamin D) property, which comprises exposing the same to radiations from uranium.

AUGUST J. PACINI.